(12) United States Patent
Morenko et al.

(10) Patent No.: US 10,823,073 B2
(45) Date of Patent: Nov. 3, 2020

(54) FUEL NOZZLE RETAINING BRACKET

(71) Applicant: PRATT & WHITNEY CANADA CORP., Longueuil (CA)

(72) Inventors: Oleg Morenko, Oakville (CA); Ryan Miskie, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 96 days.

(21) Appl. No.: 15/048,247

(22) Filed: Feb. 19, 2016

(65) Prior Publication Data
US 2017/0241345 A1    Aug. 24, 2017

(51) Int. Cl.
*F02C 7/22*    (2006.01)

(52) U.S. Cl.
CPC .......... *F02C 7/222* (2013.01); *F05D 2260/31* (2013.01)

(58) Field of Classification Search
CPC .... F02C 7/222; F02C 7/22; F02C 7/28; F05D 2240/00; F05D 2260/31; A47B 96/07; A47B 96/068; F23R 3/283; F16B 45/04; F16B 7/04; F16B 7/0486; F16M 13/02; F16M 13/022; E04G 21/26
USPC .................................................... 403/61, 353
See application file for complete search history.

(56) References Cited

U.S. PATENT DOCUMENTS

| | | | | |
|---|---|---|---|---|
| 1,835,339 | A * | 12/1931 | Rossman | F16B 7/0493 403/188 |
| 2,690,648 | A * | 10/1954 | Pearce | F02C 7/222 285/124.1 |
| 3,147,594 | A * | 9/1964 | Hill | F23R 3/20 60/739 |
| 5,197,288 | A * | 3/1993 | Newland | F02C 7/222 60/734 |
| 6,755,024 | B1 * | 6/2004 | Mao | F23D 11/107 239/416 |
| 7,617,683 | B2 * | 11/2009 | Prociw | F02C 7/222 60/734 |
| 7,624,956 | B2 * | 12/2009 | Steigert | F01N 13/10 180/309 |
| 8,037,690 | B2 * | 10/2011 | Morenko | F02C 7/222 60/39.094 |
| 8,393,154 | B2 | 3/2013 | Gandza | |
| 8,516,830 | B2 * | 8/2013 | Duval | F23R 3/283 60/740 |
| 9,096,303 | B2 | 8/2015 | Cheung et al. | |
| 2002/0069647 | A1 * | 6/2002 | Mayersky | F02C 7/222 60/796 |

* cited by examiner

*Primary Examiner* — Andrew D StClair
(74) *Attorney, Agent, or Firm* — Norton Rose Fulbright Canada LLP

(57) ABSTRACT

A fuel supply assembly for a gas turbine engine includes at least one fuel transfer tube, at least one fuel nozzle, and at least one retaining bracket. The transfer tube and the nozzle are assembled in fluid communication with one another. The retaining bracket is fixedly attached to one of the nozzle and the transfer tube and displaceable relative thereto between a first position and a second position. A free end of the bracket is engageable with the other of the fuel nozzle and the transfer tube to retain the transfer tube to the fuel nozzle when the bracket is in the second position. The retaining bracket is disengaged from one of the fuel nozzle and the transfer tube in the first position so that the fuel nozzle and the transfer tube are disengageable from one another.

9 Claims, 4 Drawing Sheets

FUEL NOZZLE RETAINING BRACKET

TECHNICAL FIELD

The application relates generally to gas turbine engines and, more particularly, to fuel supply systems for such engines.

BACKGROUND

Fuel supply systems for combustors of gas turbine engines often include a fuel manifold, such as an external fuel manifold which extends around the outer casing to supply fuel to fuel nozzles extending through the casing wall. A number of transfer tubes receive fuel from the main fuel line and are connected to a fuel nozzle to supply fuel thereto.

A retaining clip retains the transfer tube in place for connection to a corresponding fuel nozzle. Retaining clips help ensure the integrity of the fuel system, however retaining clips are sometimes not installed, or installed poorly, due to assembler inattention or inexperience. Missing or improperly installed retaining clips may lead to fuel leaks or unwanted disengagement of the transfer tube from the fuel nozzle during engine operation.

SUMMARY

There is provided a fuel supply assembly for a gas turbine engine, comprising at least one fuel transfer tube, at least one fuel nozzle, and at least one retaining bracket, the fuel transfer tube and the fuel nozzle assembled in fluid communication with one another, the retaining bracket fixedly attached to one of the fuel nozzle and the transfer tube and displaceable relative thereto between a first position and a second position, a free end of the retaining bracket engageable with the other of the fuel nozzle and the transfer tube to retain the transfer tube to the fuel nozzle when the bracket is in the second position, the retaining bracket disengaged from said one of the fuel nozzle and the transfer tube in the first position so that the fuel nozzle and the transfer tube are disengageable from one another.

There is also provided a fuel nozzle for a fuel system of a gas turbine engine, the fuel nozzle comprising a retaining bracket fixedly attached to the fuel nozzle and displaceable relative thereto between a first position and a second position, a free end of the retaining bracket engageable with a fuel transfer tube of the fuel system to retain the transfer tube to the fuel nozzle when the retaining bracket is in the second position, the retaining bracket disengaged from the transfer tube in the first position so that the fuel nozzle and the transfer tube are disengageable from one another.

There is further provided a method of retaining at least one fuel transfer tube to a fuel nozzle, the method comprising: providing a retaining bracket attached to one of the fuel nozzle and the fuel transfer tube, the retaining bracket being displaceable between first and second positions; displacing the retaining bracket from the first position to the second position to align an alignment feature of the retaining bracket with a locating feature on said one of the fuel nozzle and the fuel transfer tube, the retaining bracket engaging the other of the fuel nozzle and the fuel transfer tube when the alignment feature and the locating feature are aligned in said second position; and securing the retaining bracket in said second position to engage the fuel nozzle and the fuel transfer tube together.

BRIEF DESCRIPTION OF THE DRAWINGS

Reference is now made to the accompanying figures in which.

DETAILED DESCRIPTION

Figure 1:
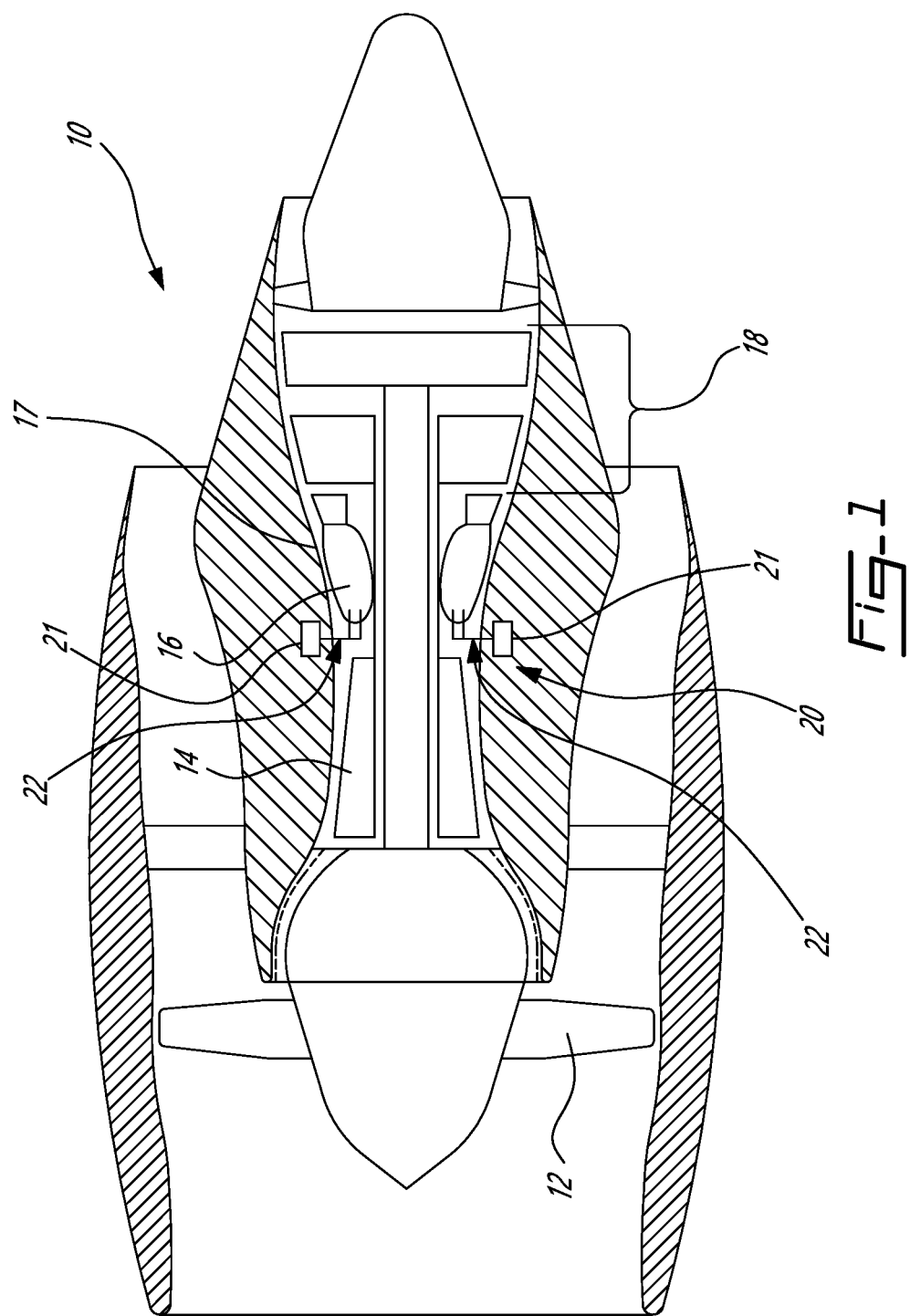
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The combustor 16 has a fuel supply assembly 20 which includes one or more fuel nozzles 22, and one or more fuel transfer tubes 21 which supply fuel to a corresponding fuel nozzle 22. Each fuel nozzle (or simply "nozzle") 22 typically has a nozzle head located outside of a casing 17 of the combustor 16, a nozzle tip located within the casing 17, and a nozzle stem connecting the head to the tip and providing fuel communication therebetween.

Figure 2:
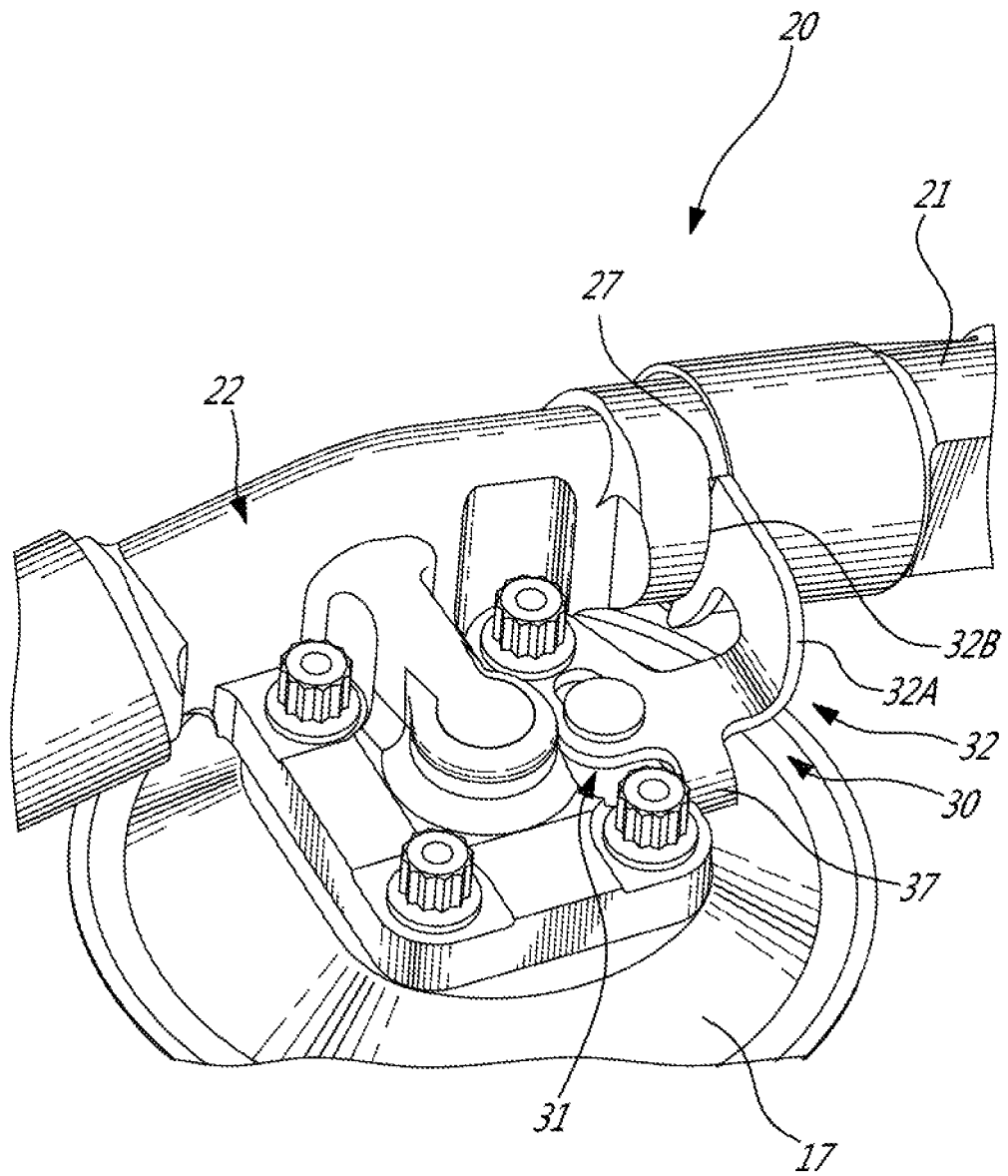
FIG. 2 is a perspective view of a fuel nozzle, a transfer tube, and a fuel supply manifold of the gas turbine engine of FIG. 1.

Referring to FIG. 2, the fuel supply assembly 20 also includes a retaining bracket 30 or clip which is affixed to (i.e. in a captive manner, such that it cannot readily be removed by hand from) one of the fuel nozzle 22 (or "nozzle 22") and the fuel transfer tube 21 (or "transfer tube 21"). The retaining bracket helps to retain the transfer tube 21 to the nozzle 22 through all engine operating conditions, and is shown in FIG. 2 in its properly installed configuration where it engages both the fuel nozzle 22 and the transfer tube 21.

The retaining bracket 30 is employed during installation of the nozzle 22. When properly installed, the retaining bracket 30 (or simply "bracket 30") reduces the likelihood and/or prevents the transfer tube 21 from disengaging from the nozzle 22 during engine operation. It is known that the hazard level associated with omitting the retaining clip during assembly of the fuel supply assembly is 1, which is considered to be the highest. This high hazard level therefore typically requires a witness to visually observe the installed retaining clip, and to confirm that it is properly installed. While some retaining clips help to reduce the risk of the clip not being installed, most of these are not configured such that only a multiple-level failure will result in misassembly of the clip. The bracket 30 disclosed herein offers, in at least one embodiment, a mistake-proof technique for properly installing the bracket 30, which may reduce the likelihood of mistakes or misassembly, which can favour safer engine operation.

The bracket 30 can be fixedly attached to either one of the nozzle 22 or the transfer tube 21. Therefore, even though the bracket 30 is shown in the figures and described herein for the purposes of simplicity as being fixedly attached to the fuel nozzle 22, the bracket 30 is not limited to this configuration. The bracket 30 may be attached to the transfer tube 21 and displaceable therewith to engage the nozzle 22.

Still referring to FIG. 2, the bracket 30 has a first portion 31 that is fixedly attached to the fuel nozzle 22, and a second portion 32 which can engage the transfer tube 21 so as to retain it to the nozzle 22, as shown in dotted lines in FIG. 2. The bracket 30 also has an alignment feature 33 (see FIG. 3A) which helps to properly position the bracket 30 on the nozzle 22 so that the bracket 30 engages the transfer tube 21, and which prevents installation of the bracket 30 when it is not in the correct position on the nozzle 22.

The first portion 31 can be a flange, plate or other segment of the bracket 30 that is fixedly attached to the nozzle 22. The expression "fixedly attached" indicates that the first portion 31 is secured to the nozzle 22 such that it cannot be easily removed therefrom. Despite this attachment to the nozzle 22, the first portion 31 is nevertheless displaceable with respect to the nozzle 22 such that its position, and thus the position of the bracket 30, can be adjusted relative to the nozzle 22. It can thus be appreciated that the bracket 30 is permanently affixed to the nozzle 22 via the first portion 31, such that the bracket 30 is always present during installation of the nozzle 22. This permanent attachment of the bracket 30 therefore reduces the likelihood that the bracket 30 will be omitted or forgotten during installation of the nozzle 22.

The second portion 32 is a "free" portion or end of the bracket 30 because it is displaceable with the bracket 30 to engage the transfer tube 21. The second portion 32 can also be a flange, plate or other segment of the bracket 30 that is integral with the first portion 31. In the embodiment shown, the second portion 32 includes an engagement arm 32A which extends from the first portion 31. A distal extremity of the engagement arm 32A forms an arcuate interface 32B which engages with a correspondingly-shaped slot 27 in the nozzle 22. Other configurations for the second portion 32 are also within the scope of the present disclosure.

Figure 3A:
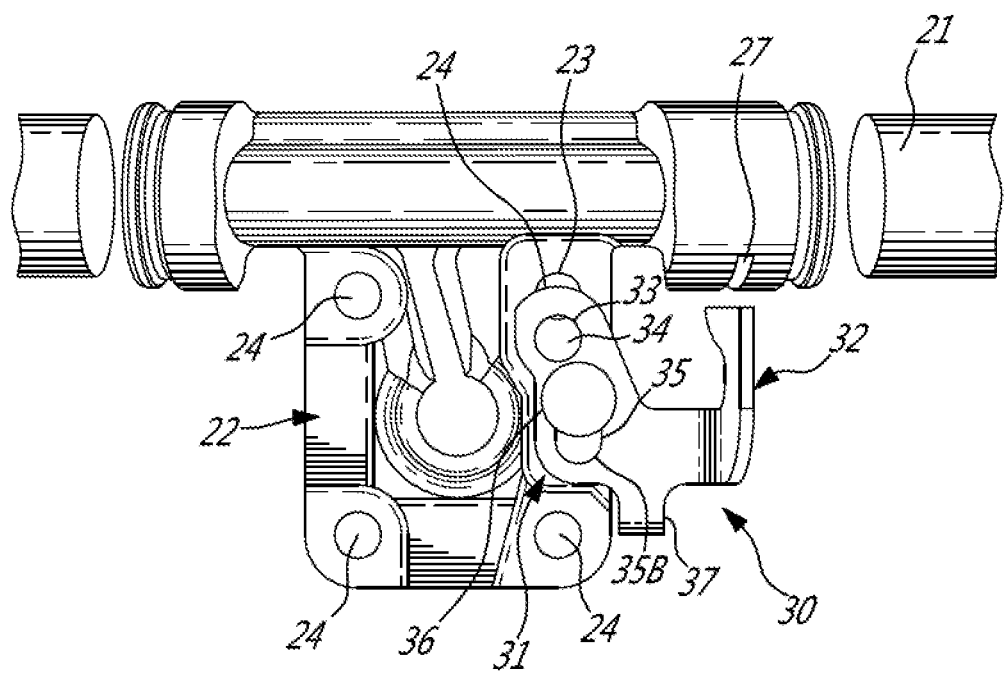
FIG. 3A is a top view of the fuel nozzle and transfer tube of FIG. 2, a retaining bracket being shown in a first position.
Figure 3B:
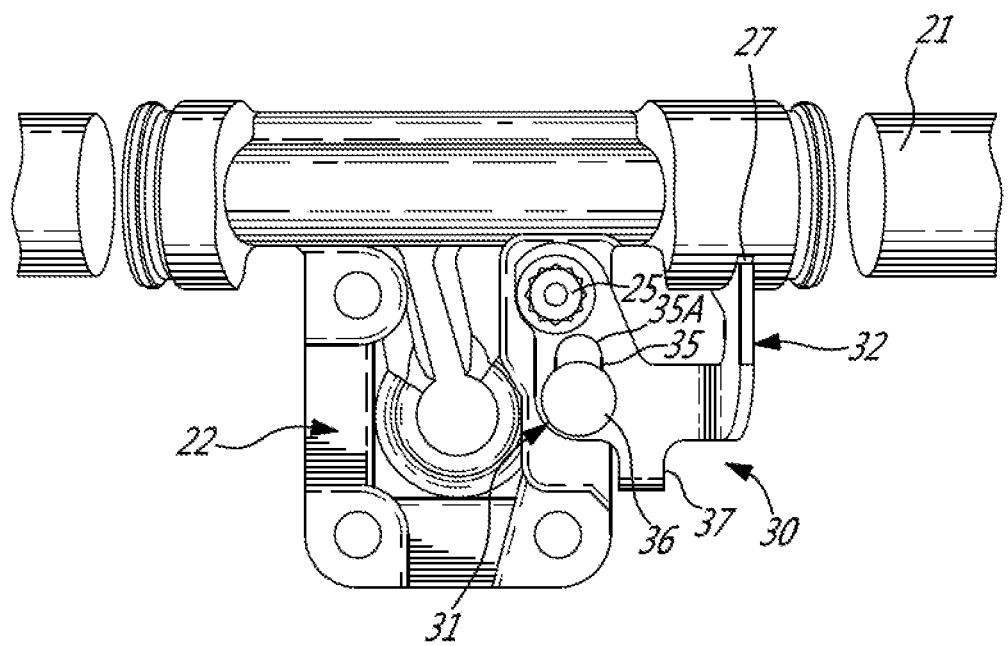
FIG. 3B is another top view of the fuel nozzle and transfer tube of FIG. 2, the retaining bracket being shown in a second position.

Referring to FIGS. 3A and 3B, the alignment feature 33 helps to position the bracket 30 so that it correctly engages the transfer tube 21, and also prevents installation of the bracket 30 when the alignment feature 33 is in the incorrect position. It will thus be appreciated that the alignment feature 33 can be any fastener, aperture, or other feature of the bracket 30 capable of such functionality. In the embodiment shown, the alignment feature 33 includes at least one bracket bolt hole 34. In other embodiments, the alignment feature 33 includes a depression engageable with a corresponding protrusion or pin. Still other configurations for the alignment feature 33 can include a dog received within a slot, mating brackets or flanges, and/or clipping arrangements. It will thus be appreciated that configurations of the alignment feature 33 not shown in the figures or described herein are also within the scope of the present disclosure.

The alignment feature 33 is displaceable with the first portion 31 (and the bracket 30) between a first position and a second position.

In the first position, as shown in FIG. 3A, the alignment feature 33 is not aligned with a corresponding locating feature 23 of the fuel nozzle 22. The locating feature 23 in the embodiment shown is located on a shoulder of the nozzle 22, and includes a fuel nozzle bolt hole 24, and thus corresponds to the bracket bolt hole 34 of the bracket 30. Similarly to the alignment feature 33 described above, configurations of the locating feature 23 not shown in the figures or described herein are also within the scope of the present disclosure, provided that they can align with the alignment feature 33 of the bracket 30. Examples of locating features 23 include a pin, depression, slot, bracket, flange, and/or clipping arrangements.

The misaligned alignment feature 33 and locating feature 23 in the first position prevent a bolt 25 or fastener from being used to secure the bracket 30 to the nozzle 22 and the fuel nozzle 22 to the casing 17. The misaligned alignment feature 33 and locating feature 23 also prevent the second portion 32 from engaging the transfer tube 21. As will be explained in more detail below, the position of the alignment feature 33 and of the bracket 30 in the first position is such that the second portion 32 is physically incapable of engaging the transfer tube 21 to retain it to the nozzle 22. Therefore, when the bracket 30 is in the incorrect position on the nozzle 22, a technician is prevented from using the bracket 30 to retain the transfer tube 21.

In the second position, as shown in FIG. 3B, the alignment feature 33 is aligned with the locating feature 23. The bracket 30 is therefore correctly positioned on the nozzle 22, and the aligned alignment feature 33 and locating feature 23 allow the bolt 25 to be used as a common fastener to secure the bracket 30 to the nozzle 22 and the fuel nozzle to the casing 17. This correct positioning of the bracket 30 allows the second portion 32 to engage the transfer tube 21 to retain the transfer tube 21 to the fuel nozzle 22.

In the embodiment shown in FIGS. 3A and 3B, the second portion 32 engages the transfer tube 21 in the second position (FIG. 3B) when the bracket hole 34 overlies the corresponding fuel nozzle hole 24. The bolt 25 can then inserted through both aligned holes 34, 24 and secured in the nozzle 22 to retain the transfer tube 21 to the fuel nozzle 22. Conversely, the second portion 32 is prevented from engaging the transfer tube 21 in the first position (FIG. 3A) when the corresponding bracket and fuel nozzle holes 34, 24 do not overly one another. Other configurations for the bracket and fuel nozzle holes 34, 24 where they do not lie over one another are also within the scope of the present disclosure. It will also be appreciated that the bracket 30 and nozzle 22 can have more than one bracket hole 34 and fuel nozzle hole 24, respectively. Indeed, FIGS. 3A and 3B show the nozzle 22 having four fuel nozzle holes 24.

It can thus be appreciated that the retaining bracket 30 is secured to the fuel nozzle 22 when the retaining bracket 30 is in the second position, and when a fastener (i.e. the bolt 25) is inserted through the aligned bracket hole 34 and corresponding fuel nozzle hole 24. A double failure—the bracket 30 is not properly positioned, and the bolt 25 is missing—is therefore required to misassemble the bracket 30 with the transfer tube 21. Stated differently, the bracket 30 can only engage the transfer tube 21 to retain it to the nozzle 22 if 1) the bracket 30 is properly positioned on the nozzle 22, and 2) the bolt 25 is secured through the aligned alignment feature 33 and locating feature 23. This is an improvement over existing retaining clips which are not permanently attached to the fuel nozzle, because these clips only require a single failure (i.e. the bolt is missing) to misassemble the clip with the transfer tube. Stated differently, these conventional clips could still engage the transfer tube even if they are not properly positioned on the nozzle, provided that they are secured to the nozzle with the bolt. As will be discussed in greater detail below, other embodiments of the retaining bracket 30 require triple, quadruple, or other multiple failures to misassemble the bracket 30 with the transfer tube 21.

Still referring to FIGS. 3A and 3B, the bracket 30 can have different shapes and configurations to accomplish the above-described displacement. One possible configuration of the first portion 31 of the bracket 30 includes an elongated slot 35. A retaining member 36, which in this exemplary example includes a pin, is positioned in the slot 35 and also fixedly attached to the nozzle 22. The retaining member 36 is positioned, shaped, and sized to attach the first portion 31 to the nozzle 22 via the slot 35, and to also allow the slot 35 to be linearly displaced relative to the fixed-in-place retaining member 36. The bracket 30 is thus also linearly displaceable relative to a surface of the nozzle 22 by sliding the first portion 31 relative to the retaining member 36. In the configuration where the retaining member 36 is a headed pin, the head of the pin can have a diameter or size that is larger than a width of the slot 35 in order to prevent the slot 35/first portion 31 from coming off the nozzle 22. It is however to be understood that the retaining member 36 may be something other than a headed pin, for example a headless pin, a protruding guide, one or more raised ridges, teeth or other guide elements that are disposed on one of the nozzle 22 and the sliding bracket 30 and which is received within a corresponding sized and/or shaped opening located in the other of the nozzle 22 and the sliding bracket 30. Further, it is to be understood that the retaining member 36 may include multiple of such pins or alternate guide elements. There can also be a clearance or space between the pin and a surface of the first portion 31 to allow the relative sliding movement. Other configurations of the bracket 30 which allow the above-described displacement are also within the scope of the present disclosure. For example, non-linear displacement, such as a rotating displacement of the bracket 30 relative to the nozzle 22, is also possible.

The movement of the slot 35 relative to the retaining member 36 is confined to a limited movement band defined by a first extremity 35A and an opposed second extremity 35B of the slot 35. More particularly, when the retaining member 36 engages the first or second extremities 35A, 35B of the slot 35 during displacement of the first portion 31, the first portion 31 is prevented from being displaced further. Therefore, movement of the bracket 30 is limited in this embodiment to being along the slot 35.

In the first position (FIG. 3A), the retaining member 36 engages the first extremity 35A of the slot 35 and the alignment feature 33 and the locating feature 23 are misaligned. Stated differently, in this embodiment, the bracket 30 is not properly positioned on the nozzle 22, the second portion 32 is incapable of engaging the transfer tube 21, and the bolt 25 cannot be inserted through the misaligned bracket and fuel nozzle holes 34, 24.

In the second position (FIG. 3B), the retaining member 36 engages the second extremity 35B and the alignment feature 33 and the locating feature 23 are aligned. Stated differently, in this embodiment, the bracket 30 is properly positioned on the nozzle 22, the second portion 32 is capable of engaging the transfer tube 21, and the bolt 25 can be inserted through the aligned bracket and fuel nozzle holes 34, 24.

Another possible configuration of the bracket 30 includes a movement-limiting flange 37 or tang. The flange 37 extends transversely from the first portion 31 and can abut against the nozzle 22, or some part thereof such as its shoulder. The flange 37, in conjunction with its abutment with the nozzle 22, prevents the technician from rotating or misaligning the bracket 30 during installation. The flange 37 can thus be viewed as an anti-rotation feature, and helps to confine displacement of the bracket 30 in a linear direction along the surface of the nozzle 22. The flange 37 can also be used as a pusher/puller to facilitate assembly.

Figure 4A:
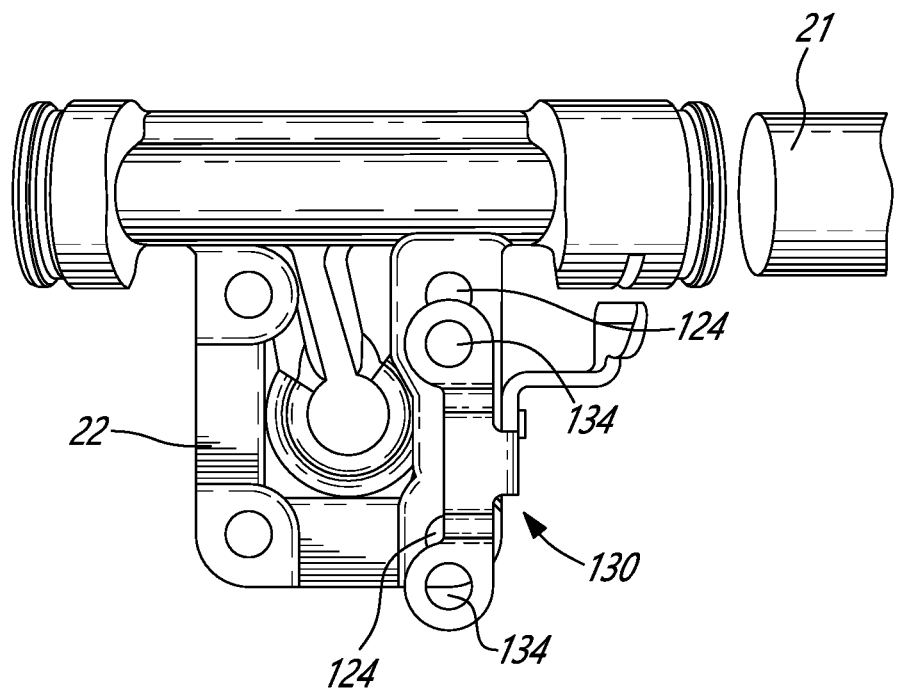
FIG. 4A is a top view of the fuel nozzle and transfer tube of FIG. 2, a retaining bracket according to another embodiment of the present disclosure being shown in a first position.
Figure 4B:
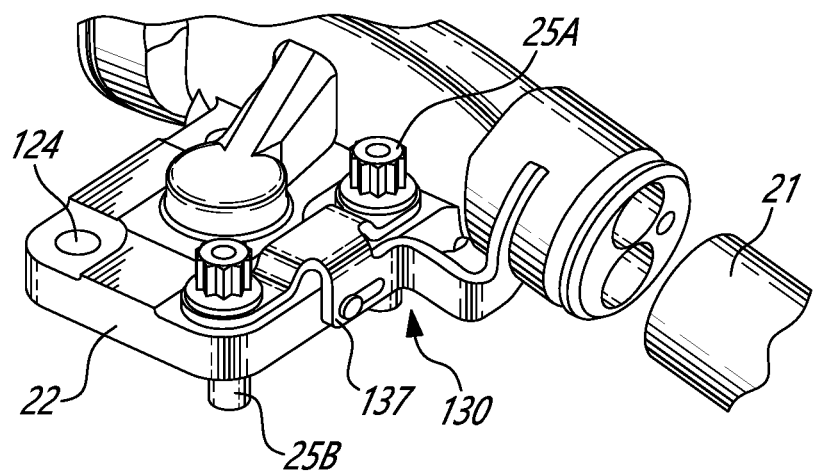
FIG. 4B is a perspective view of the fuel nozzle and transfer tube of FIG. 2, the retaining bracket of FIG. 4A being shown in a second position.

Referring to FIGS. 4A and 4B, another embodiment of the bracket 130 is shown. The bracket 130 has multiple, in this case two, bracket bolt holes 134 which align with, and are misaligned with, two corresponding fuel nozzle bolt holes 124. Therefore, the bracket 130 of this embodiment requires a triple failure—the bracket 130 is not properly positioned on the nozzle 22, a first bolt 25A is missing, and a second bolt 25B is missing—to misassemble the bracket 130 with the transfer tube 21. Stated differently, the bracket 130 can only engage the transfer tube 21 to retain it to the nozzle 22 if 1) the bracket 130 is properly positioned on the nozzle 22, 2) the first bolt 25A is secured through a first pair of aligned bracket and fuel nozzle bolt holes 134,124, and 3) the second bolt 25B is secured through a second pair of aligned bracket and fuel nozzle bolt holes 134,124. The bracket 130 therefore adds an additional failure mode for improved safety. The bracket 130 also has a movement-limiting flange 137.

Referring to FIGS. 3A and 3B, there is also disclosed a method of retaining a fuel transfer tube 21 to a fuel nozzle 22. The method includes attaching a first portion 31 of the retaining bracket 30 to the fuel nozzle 22, where the retaining bracket 30 is displaceable relative to the fuel nozzle 22. The method also includes displacing the retaining bracket 30 relative to the fuel nozzle 22 to align an alignment feature 33 with a locating feature 23 on the fuel nozzle 22. A second portion 32 of the retaining bracket 30 engages the transfer tube 21 when the alignment feature 33 and the locating feature 23 are aligned. The method also includes securing the retaining bracket 30 to the fuel nozzle 22 when the second portion 32 is engaged with the transfer tube 21.

In light of the preceding, it can be appreciated that the retaining bracket 30,130 disclosed herein may assist with overcoming problems associated with conventional retention clips which are improperly installed, or not installed at all because of an oversight. More particularly, the bracket 30,130 may be permanently attached to the nozzle 22 and displaceable relative thereto. Replacement/installation of the fuel nozzle 22 may thus be configured to be less susceptible to installation mistakes.

The above description is meant to be exemplary only, and one skilled in the art will recognize that changes may be made to the embodiments described without departing from the scope of the invention claimed. For example, the bracket 30,130 is described as being used with a fuel nozzle, and it will be appreciated that the bracket 30,130 can be used for other components of a fuel supply assembly or fuel system, where it is desired to retain the component to another in order to reduce the likelihood of improper installation and/or unwanted disengagement of one or both of the components, reduce the likelihood of fuel spills, and the like. Still other modifications which fall within the scope of the claimed invention will be apparent to those skilled in the art, in light of a review of this disclosure, and such modifications are intended to fall within the appended claims.

The invention claimed is:

1. A fuel supply assembly for a gas turbine engine, comprising:
at least one fuel transfer tube, at least one fuel nozzle, and at least one retaining bracket, the fuel transfer tube and the fuel nozzle assembled in fluid communication with one another, an elongated slot defined in one of the fuel nozzle and the fuel transfer tube; and
the retaining bracket fixedly attached to said one of the fuel nozzle and the fuel transfer tube and slidingly displaceable relative to the elongated slot between a first position and a second position while the retaining bracket remains fixedly attached to said one of the fuel nozzle and the fuel transfer tube and while the fuel transfer tube and the fuel nozzle remains assembled in fluid communication with one another, a free end of the retaining bracket engageable with the other of the fuel nozzle and the transfer tube to retain the transfer tube to the fuel nozzle when the bracket is in the second position, the retaining bracket disengaged from said one of the fuel nozzle and the transfer tube in the first position so that the fuel nozzle and the transfer tube are disengageable from one another.

2. The fuel supply assembly of claim 1, further comprising an alignment feature, the alignment feature having first and second locating features, wherein in the first position the first locating feature is misaligned with the second locating feature, and in the second position the first locating feature is aligned with the second locating feature.

3. The fuel supply assembly of claim 2, wherein the first locating feature includes a hole in the retaining bracket, and the second locating feature includes a hole in an adjacent structure, the holes configured to receive a common fastener when aligned in the second position.

4. The fuel supply assembly of claim 3, wherein the free end of the retaining bracket engages the transfer tube in the second position when the hole in the retaining bracket overlies the hole in the adjacent structure, and wherein the free end of the retaining bracket is prevented from engaging the transfer tube in the first position when corresponding bracket and fuel nozzle holes do not overly one another.

5. The fuel supply assembly of claim 3, wherein the retaining bracket is secured to the fuel nozzle with the retaining bracket in the second position, when a fastener is received through the aligned holes of the retaining bracket and the adjacent structure.

6. The fuel supply assembly of claim 2, wherein the retaining bracket includes a first portion that is fixedly attached to the fuel nozzle, the first portion of the retaining bracket includes a slot and a retaining member disposed in the slot and fixedly attached to the fuel nozzle.

7. The fuel supply assembly of claim 6, wherein the slot is linearly displaceable relative to the retaining member within a limited movement band defined by engagement of the retaining member with first and second opposed extremities of the slot.

8. The fuel supply assembly of claim 7, wherein in the first position, the retaining member engages the first extremity of the slot and the first and second locating features are misaligned, and in the second position, the retaining member engages the second extremity and the first and second locating features are aligned.

9. The fuel supply assembly of claim 1, wherein the retaining bracket includes a movement-limiting flange extending transversely and abuttable against the fuel nozzle.

* * * * *